No. 634,423. Patented Oct. 3, 1899.
D. CAMERON, F. J. COMMIN & A. J. MARTIN.
PROCESS OF AND APPARATUS FOR TREATING SEWAGE.
(Application filed Mar. 15, 1897.)
(No Model.) 3 Sheets—Sheet 1.
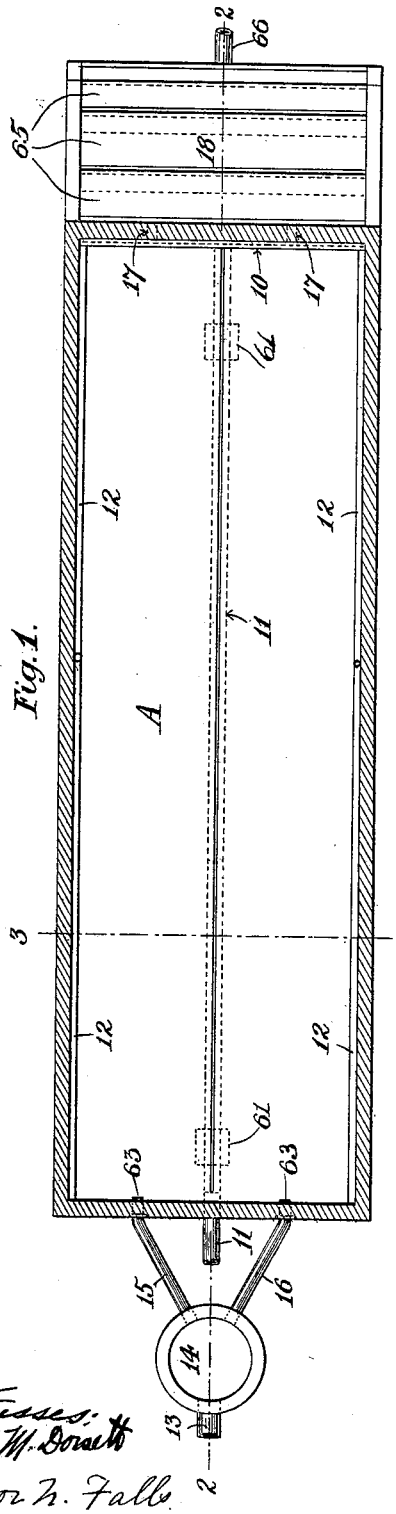
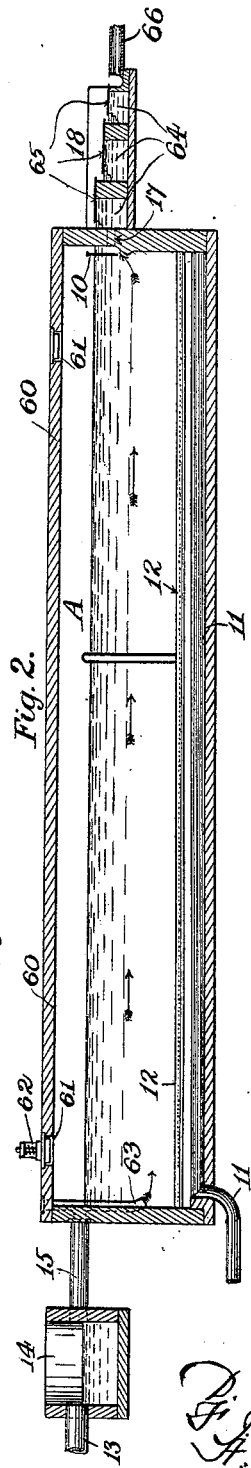
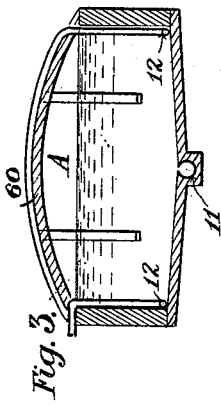

No. 634,423. Patented Oct. 3, 1899.
D. CAMERON, F. J. COMMIN & A. J. MARTIN.
PROCESS OF AND APPARATUS FOR TREATING SEWAGE.
(Application filed Mar. 15, 1897.)
(No Model.) 3 Sheets—Sheet 2.
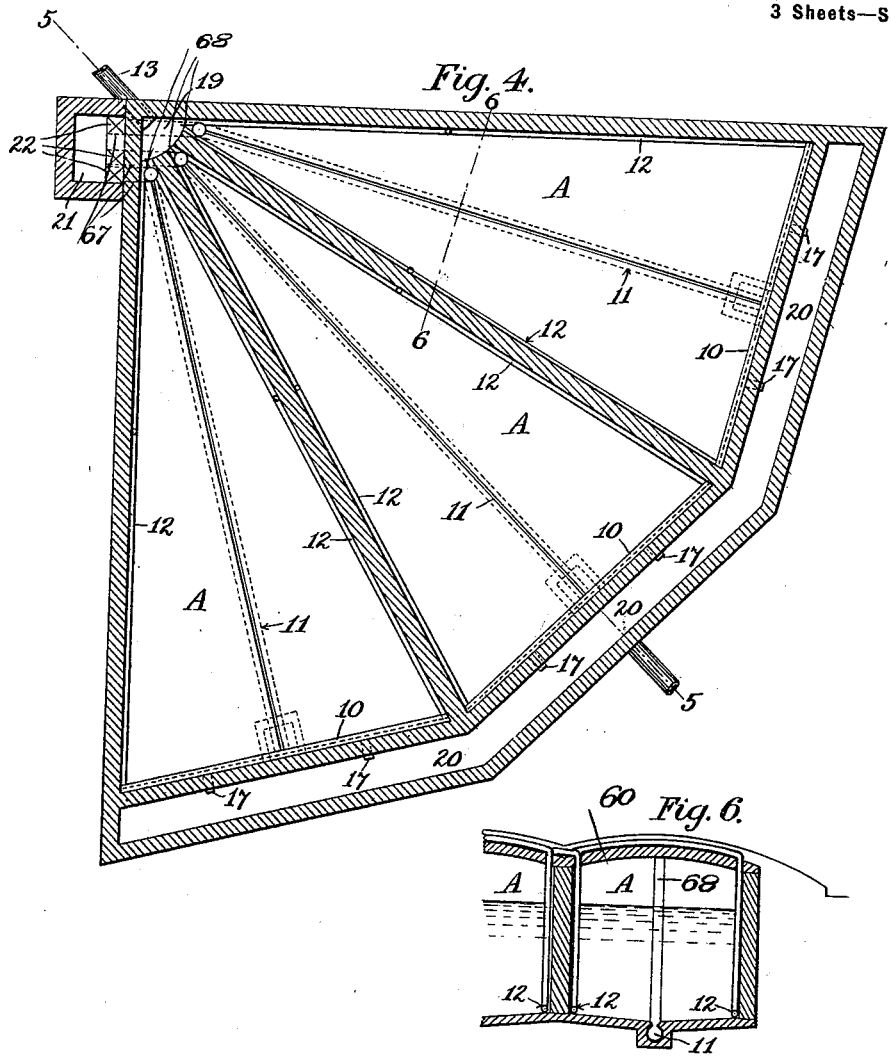
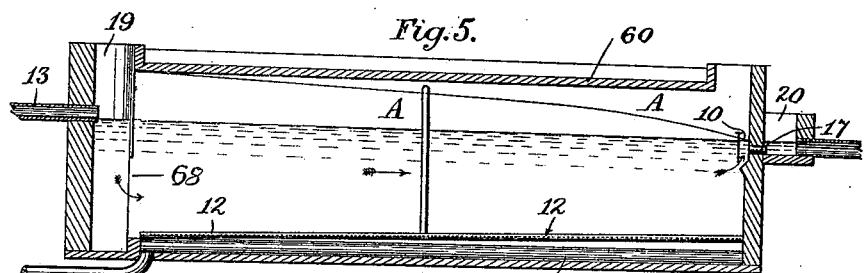

No. 634,423. Patented Oct. 3, 1899.
D. CAMERON, F. J. COMMIN & A. J. MARTIN.
PROCESS OF AND APPARATUS FOR TREATING SEWAGE.
(Application filed Mar. 15, 1897.)
(No Model.) 3 Sheets—Sheet 3.
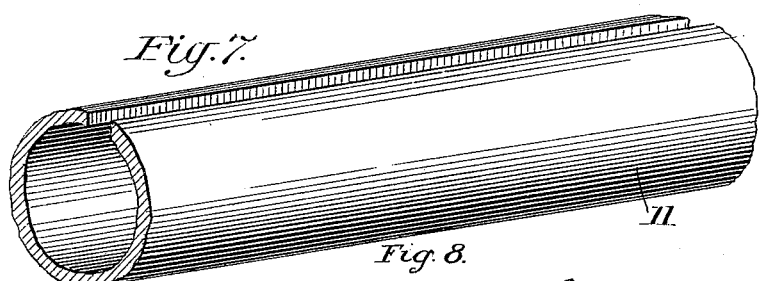
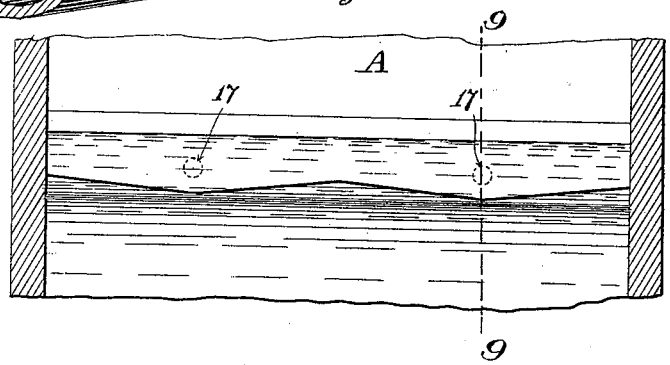 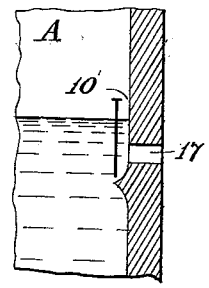
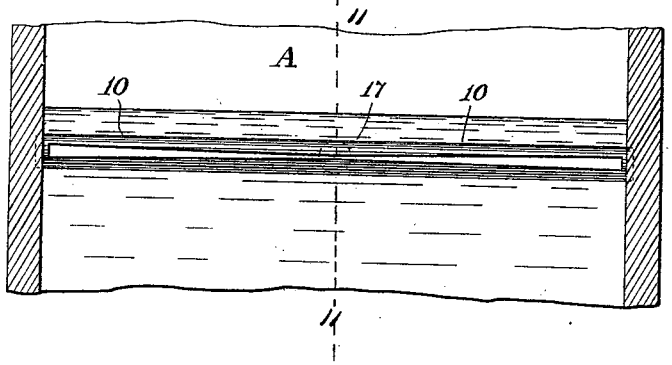 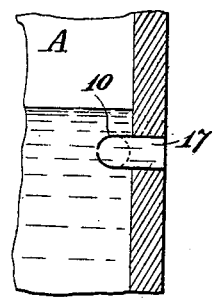

UNITED STATES PATENT OFFICE.

DONALD CAMERON, FREDERICK J. COMMIN, AND ARTHUR J. MARTIN, OF EXETER, ENGLAND.

PROCESS OF AND APPARATUS FOR TREATING SEWAGE.

SPECIFICATION forming part of Letters Patent No. 634,423, dated October 3, 1899.

Application filed March 15, 1897. Serial No. 627,578. (No model.)

*To all whom it may concern:*

Be it known that we, DONALD CAMERON, FREDERICK JAMES COMMIN, and ARTHUR JOHN MARTIN, subjects of the Queen of Great Britain, and residents of Exeter, in the county of Devon, England, have invented certain new and useful Improvements in Processes of and Apparatus for Liquefying and Purifying Sewage, (for which we have received Letters Patent in England, No. 21,142, dated November 8, 1895, and No. 23,042, dated October 17, 1896; in France, No. 264,570, dated March 2, 1897; in Belgium, No. 126,674, dated March 2, 1897; in Austria, No. 49/1,733, dated March 20, 1899; in Transvaal, No. 1,364, dated March 31, 1897; in India, No. 92, dated August 13, 1897, and No. 93, dated August 13, 1897; in Canada, No. 59,548, dated April 6, 1898; in Victoria, No. 14,047, dated March 29, 1897; in Queensland, No. 3,822, dated April 1, 1897; in South Australia, No. 3,605, dated April 1, 1897; in New Zealand, No. 9,419, dated April 8, 1897; in New South Wales, No. 7,064, dated November 19, 1896, and No. 7,066, dated November 19, 1896; in Cape Colony, No. 1,306, dated March 11, 1897, and in Egypt, under date of registration at Cairo, February 28, 1899;) and we do hereby declare that the following is a full, clear, and exact description of the invention, which will enable others skilled in the art to which it appertains to make and use the same.

The object of the invention is to provide an artificial method and apparatus for the liquefaction and purification of sewage on a practical and efficient scale in a natural and simple manner, avoiding the formation of sludge.

The invention consists in certain methods of developing in a flowing current of sewage bacteria capable of dissolving the mass of solid organic matter contained therein, of subsequently utilizing the so-developed bacteria in liquefying the mass of organic matter contained in the flowing current, and of further purifying the effluent liquid.

The invention also consists in the apparatus for carrying out the process.

The process of purification comprises the subjection of the sewage to the dissolving action of anaerobic bacteria and subsequently to exposure to air and light.

In carrying out the process the first step is to develop in a flowing current of sewage micro-organisms or bacteria of a character and quantity capable of practically liquefying the mass of solid organic matter contained in the flowing current of sewage. This is effected by forming a pool in the flowing current and secluding said pool from light, air, and agitation, while permitting a non-disturbing inflow of the sewage into the pool and an outflow therefrom. In this condition of the pool in the absence of light, air, and agitation the micro-organisms increase at a fabulous rate, being fed by the incoming solid matter of the sewage until a mass of bacteria is developed sufficient in character and quantity to liquefy substantially all the solid organic matter contained in the sewage passing through the pool. During this operation there is formed on the surface of the sewage in the pool a brown scum. This crust of solid substances floating and completely bridging over the water is from two to three inches thick, and although there is a continued inflow of raw sewage and a continued outflow of the liquid effluent this scum remains at about the same thickness and does not increase. This scum attains its thickness of from two to three inches in about a week after the tank is put into use, and although no part of it is removed it continues at the same thickness. After the formation of this practical solid-dissolving mass of bacteria the non-disturbing inflow and outflow are continued until practically all the solid organic matter is dissolved and the outflow is in the form of a liquid without solid particles of sewage. The operation goes on and the flowing current of sewage is continually liquefied. The liquefied sewage as it leaves the septic pool has a slight odor, so slight, however, that it cannot be noticed at a distance of a yard or two, and to relieve it of this slight odor it is subjected to an aerating operation.

In some systems now employed where purification is sought the crude sewage is first treated chemically, so that the solid matter is to a great extent precipitated, and it is only the liquid which is treated by filtration or otherwise. In that process the precipitated solid matter rapidly accumulates in the form of an offensive sludge, which is difficult to dispose of. By this invention the chemical treatment may be entirely dispensed with and the expense of dealing with the precipitated matter is obviated. In such previous systems it has been considered of advantage that there should be contact of the sewage matter with the air, and in the treatment of sewage according to our invention it is of the utmost importance that means be provided for preventing contact with the air and that the chamber in which the bacteriological action takes place should be dark in order to assist the bacteria contained in the sewage to rapidly multiply, as it is a well-known fact that bacteria multiply rapidly in dark places. This exclusion of air and light can be arranged by providing a closed cover to the tank or vessel. This cover may be removed after the sewage has been in the tank several days, as after such tank has been in operation for two or three days the brown scum begins to form at the top and eventually becomes two or three inches thick and serves as an air-tight cover for the sewage below. This scum is formed by bacteriological action and rises in particles from the bottom of the tank, gas forming in and carrying the particles to the top of the tank. After the tank has been in operation sufficiently long for the scum to commence forming the effluent is so free from matter in suspension that it is in a condition to be further treated by any other means—such, for example, as coke-breeze filters—or for irrigation or discharging into rivers and tidal waters.

By this invention crude sewage can be treated for long periods without practically any sludge at all forming in the tank.

The improved apparatus is shown in the accompanying drawings, in which—

Figure 1 represents a sectional plan view of a tank for use in the treatment of sewage provided with the present improvements. Fig. 2 represents a longitudinal section on the line 2 2 of Fig. 1. Fig. 3 represents a transverse section on the line 3 3 of Fig. 1. Fig. 4 represents a sectional plan view showing a modified form of such tank. Fig. 5 represents a longitudinal section on the line 5 5 of Fig. 4. Fig. 6 represents a transverse section on the line 6 6 of Fig. 4. Fig. 7 represents a perspective view of the slotted pipe 11 hereinafter referred to. Fig. 8 represents a transverse section of the tank, showing the slotted conduit 10, the slot therein diminishing in width at two points. Fig. 9 represents a longitudinal vertical section through one end of the tank, showing the outlet on line 9 9 of Fig. 8. Fig. 10 represents a transverse section of the tank, showing the slotted conduit therein, the slot in said conduit being shown diminishing in width at one point. Fig. 11 represents a longitudinal vertical section through one end of the tank, in which the outlet-conduit is disposed on line 11 11 of Fig. 10.

Figs. 1, 2, and 3 represent a suitable tank for carrying out our invention, A being the tank, which is constructed of any suitable material, such as cement-concrete. It is shallow in comparison with its other dimensions and is provided with a cover 60, which is preferably made air-tight, and a man hole or holes 61 are provided in such cover and also made air-tight. An opening with a check-valve 62 (see Fig. 2) may be placed in the cover 60 of the tank A to permit of the egress of gases of decomposition. It is not absolutely necessary for the tank to have an air-tight cover, as above described, because the dark scum which forms serves to keep both light and air from the sewage; but we consider it important to provide the cover. The inlet 63 to the tank discharges into same some distance below the normal water-level and is preferably directed horizontally, or downward, as shown, so as to avoid breaking the scum which forms in the tank when sewage has been in it for two or three days.

The outlet from the tank is submerged, preferably in the upper half of the depth of the tank, and is extended across the whole or the greater part of the width of the tank, so as to draw off the clear water below the scum or floating matter without disturbing the latter. It is necessary to discharge the contents of the tank or vessel along an extended line lest the flow should be concentrated to a point or points of discharge and so disturb and carry away the floating matter. The outlet therefore consists of a pipe or conduit 10, which may or may not be closed at its top, following the line along which it is desired that the contents of the vessel or tank A should be discharged and having throughout its length or a part thereof a slot or aperture by which liquid may enter the said pipe or conduit. Such slots or apertures may diminish in size toward the outlet or outlets from the said pipe or conduit, so as to avoid an excessive rate of flow thereinto near such outlet or outlets, thus maintaining a uniform flow into such pipe or conduit throughout its length. The slots or apertures may be placed in any position along said pipe or conduit 10, so as to admit liquid into the same in a downward, upward, horizontal, or oblique direction, as may be desired.

If desired or found advisable, the slots or apertures may be protected by a deflecting surface or surfaces so placed as to ward off solids or liquids coming from any particular direction. The slot or apertures may also be provided with a strainer for the exclusion of solid matter.

The pipe or conduit 10 may be fixed or movable.

The size of the tank will depend upon the quantity and character of the sewage to be treated. Preferably two or more tanks should be provided, so that any of them may be emptied, if necessary, without interrupting the purification of the sewage.

Another improvement relates to means for the removal of mud or other material deposited in a tank or vessel, such as A, for which purpose the bottom of such tank or vessel may, as shown in Figs. 5 and 6, be sloped toward the slot or apertures in a pipe or conduit 11 in the floor of such tank, or there may be two or more depressions in the floor of such tank, each having a separate slotted pipe or conduit 17. Where two or more pipes or conduits discharge from the same tank, each may be controlled by an independent valve, or two or more such conduits may discharge into one trunk-conduit, and for the purpose of concentrating the flow along one of the branch conduits each may be provided with a flap or slide where it enters the trunk-conduit.

Where mud or other deposited material is to be removed from the bottom of a tank, one or more slotted or perforated pipes 12, leading from a water-main or other source giving sufficient pressure, may be laid on or near the floor of such tank, so that a stream or streams of fluid may be impelled against such deposited material, so as to dislodge it and break it up.

In the arrangement shown in Figs. 1, 2, and 3 the sewage or other liquid coming through the sewer 13 is delivered into a well 14, where grit and other solid matters are allowed to settle. It then passes through the pipes 15 and 16 and the inlets 63 into the tank A, in which it may be treated either chemically, bacteriologically, or otherwise, as desired; but it is preferable to treat it bacteriologically. After treatment in the tank A it passes into the pipe or conduit 10 through the slots or apertures provided for the purpose, the effect of which is that it is evenly delivered all along the line of the opening or openings into the pipe or conduit and concentration of the flow to one or more points is avoided. From the pipe or conduit 10 the effluent passes through pipes 17 (which may, if desired, be provided with suitable valves) into the aerator 18, which, as shown, is divided into a suitable number of compartments 64. The effluent passes into the first of these compartments, and when this is filled it passes out through an opening at the top into a slightly-sloping surface 65, down which it flows in thin films until it falls into the next compartment 64, this operation being repeated until it arrives at the last compartment, whence it may, if desired, be conveyed through pipe 66 to a filter or filters for further treatment. It will be seen that as the effluent passes over the inclined surface 65 it will be exposed to the action of the air and so aerated. Instead of employing the form of aerator above described an overhanging lip or lips may be provided, over which the effluent falls in a thin film or films exposed on both sides to the air.

The invention also relates to a special form of tank in which a liquid is to be treated for the removal of solid matter by subsidence, flotation, or otherwise, or for containing liquid for any other purpose in connection with which it is desirable that the contained liquid be disturbed as little as possible by liquid entering the tank. This form of tank is illustrated in Figs. 4, 5, and 6. In carrying out this part of our invention the liquid to be treated is delivered to the tank through an inlet opening or conduit having the same cross-section as the tank at the place of entry, so that the incoming stream may fill the whole cross-section of the tank, such cross-section preferably increasing as to one or both of its dimensions as the inlet is receded from. Such a tank may have the form of a wedge, as shown clearly in Fig. 4, with an inlet 68 at the apex. The cross-section of the tank A may diminish toward the outlet in the same manner as it increases from the inlet, or, as shown, the outlet may consist of a slotted pipe or conduit 10, either open or closed at the top, extending across the tank. Two or more of such tanks A may be placed side by side. In Fig. 4 three are shown; but it will be understood that the set of tanks may form the sectors of a complete circle, having their inlets at the center. The principal advantages of such a tank are: (a) The avoidance of the eddy-currents which would be produced in an ordinary tank and would interfere with the subsidence of suspended matter. (b) The largeness of the cross-section secured at the end farthest from the inlet gives a comparative state of rest which is unattainable with a tank of equal capacity of any other form. (c) The graduation of the deposited matter according to size and density obtained by the gradual reduction of velocity due to increasing cross-section.

In the arrangement shown in Figs. 4, 5, and 6 the sewage or other liquid enters the apparatus through the sewer or pipe 13, from whence it passes through the inlet-well 19 and inlets 68 into the tanks A, where, as in the previous arrangement, it may be treated either chemically, bacteriologically, or otherwise, as desired. After treatment in the tanks A it passes through the slotted pipes or conduits 10 and pipes 17 into a conduit 20, whence it may be conducted to an aerator, as in the previous arrangement, or direct to a filter or filters, if desired.

It will be seen that the floors of the tanks A are each provided with a slotted pipe or conduit 11 for the purpose of removing matter collecting in the bottoms of such tanks, pipes 12, having slots or apertures, also being provided for the purpose of breaking up or dislodging such deposited matter by means of a stream or streams of fluid.

The ends of pipes 11 may, as shown in Fig. 4, be connected to pipes 67, opening into a well 21, in which sluices 22 are arranged, which can be opened when it is desired to remove the deposited matter from any of the tanks A.

What we claim, and desire to secure by Letters Patent, is—

1. The process of purifying sewage which consists in subjecting the sewage under exclusion of air, of light and of agitation to the action of anaerobic bacteria until the whole mass of solid organic matter contained therein becomes liquefied, and then subjecting the liquid effluent to air and light.

2. The process of liquefying the solid matter contained in sewage, which consists in secluding a pool of sewage having a non-disturbing inflow and outflow, from light, air and agitation until a mass of micro-organisms has been developed of a character and quantity sufficient to liquefy the solid matter of the flowing sewage, the inflow serving to sustain the micro-organisms, and then subjecting said pool under exclusion of light and air and under a non-disturbing inflow and outflow to the liquefying action of the so-cultivated micro-organisms until the solid organic matter contained in the flowing sewage is dissolved.

3. The process of liquefying the solid matter contained in sewage, which consists in secluding a pool of sewage having a non-disturbing inflow and outflow, from light, air and agitation until a mass of micro-organisms has been developed of a character and quantity sufficient to liquefy the solid matter of the flowing sewage, the inflow serving to sustain the micro-organisms, then subjecting said pool under a non-disturbing inflow and outflow and under exclusion of light and air to the liquefying action of the so-cultivated micro-organisms until the solid organic matter contained in the flowing sewage is dissolved, and then subjecting the liquid outflow to an aerating operation.

4. The process of liquefying the solid matter contained in sewage, which consists in secluding a pool of sewage having a non-disturbing inflow and outflow from light, air, and agitation until a mass of micro-organisms has been developed of a character and quantity sufficient to liquefy the solid matter of the flowing sewage, the inflow serving to sustain the micro-organisms, then subjecting said pool under a non-disturbing inflow and outflow and under exclusion of light and air to the liquefying action of the so-cultivated micro-organisms until the solid organic matter contained in the flowing sewage is dissolved, then subjecting the liquid outflow to an aerating operation, and then to a filtering operation.

5. In an apparatus for the purification of sewage, the combination of a septic tank having an outlet disposed above the bottom and below the normal water-level of the tank, and open across the greater part of the width thereof, and an aerator connected with said outlet.

6. In an apparatus for purifying sewage, the combination of a drain or sewer, a settling-tank, connected therewith and adapted to receive the contents thereof, a septic tank connected with said settling-tank and provided with an outlet disposed above the bottom and below the normal water-level of the tank and open across the greater part of the width thereof.

7. In an apparatus for the purification of sewage, the combination of a septic tank, and an outlet therefor disposed above the bottom and below the normal water-level thereof, said outlet comprising a conduit having a longitudinal slot open across the greater part of the width of the tank.

8. In an apparatus for the purification of sewage, the combination of a septic tank having an outlet consisting of a pipe extending across the greater part of the width of the tank and disposed above the bottom and below the normal water-level thereof, said pipe having an opening in its wall throughout its length for admitting the effluent.

9. The combination of a septic tank for the liquefaction of sewage, and an outlet extending across the greater part of the width of said tank and disposed below the normal water-level of the tank, said outlet comprising a conduit having a longitudinal slot extending the greater part of the length thereof, said slot diminishing in width at any desired point or points to equalize the flow from the tank.

10. The combination of a septic tank for the liquefaction of sewage, an outlet extending across the greater part of the width of the tank and disposed below the normal water-level thereof, said outlet comprising a conduit having a longitudinal slot therein extending the greater part of its length, and diminishing in width at a desired point, and a pipe connected with said slotted pipe opposite the diminished portion of the slot for discharging the effluent from said conduit.

11. In an apparatus for purifying sewage, the combination of a septic tank, an inlet disposed above the bottom of the tank and below the normal water-level thereof and occupying the greater part of the width of said tank, and an outlet extending across the greater part of the width of the tank and disposed above the bottom of the tank and below the normal water-level thereof.

12. In an apparatus for purifying sewage, the combination of a septic tank, an inlet occupying the greater part of the width of said tank, and an outlet extending across the greater part of the width of the tank and disposed above the bottom of the tank and below the normal water-level thereof, said outlet comprising a pipe having a longitudinal slot therein extending the greater part of its length.

13. In an apparatus for purifying sewage, the combination of a tank for containing sewage, an inlet extending across the greater part of the width of the tank, and an outlet extending across the greater part of the width of said tank and disposed above the bottom and below the normal water-level thereof, said outlet comprising a pipe having a longitudinal slot extending practically the whole length thereof, said slot diminishing in width at any desired point or points.

14. The combination of a tank for the purification of sewage, an inlet extending across the greater part of the width of the tank, an outlet extending across the greater part of the width of the tank and disposed above the bottom of the tank and below the normal water-level thereof, and a slotted pipe or conduit disposed in the floor of said tank for the removal of the deposited matter.

15. The combination of a tank for the purification of sewage, an inlet occupying practically the entire cross-sectional area of the tank, an outlet extending across the greater part of the width of the tank and disposed above the bottom of the tank and below the normal water-level thereof, and a slotted pipe or conduit disposed in the floor of said tank for the removal of the deposited matter, said floor sloping toward said pipe.

16. The combination of a tank for the purification of sewage, an inlet open practically the entire cross-sectional area of the tank, an outlet open across the greater part of the width of the tank and disposed above the bottom of the tank and below the normal water-level thereof, and perforated pipes disposed in said tank, and means for delivering fluid under pressure into said pipes.

17. The combination of a tank for the purification of sewage, an inlet occupying practically the entire cross-sectional area of the tank, an outlet open across the greater part of the width of the tank and disposed above the bottom of the tank and below the normal water-level thereof, a slotted pipe or conduit disposed in the floor of said tank for the removal of the deposited matter, said floor sloping toward said pipe, perforated pipes disposed in said tank, and means for delivering fluid under pressure into said pipes.

18. In an apparatus for liquefying sewage, the combination of a tank, an inlet open across the greater part of the width of the tank and disposed below the normal water-level thereof, and an outlet open across the greater part of the width of the tank on a plane above the inlet and below the normal water-level of the tank.

19. The combination of a septic tank, a pipe disposed at the bottom of said tank and provided with openings, and perforated pipes 12 disposed at the bottom of said tank and adapted for delivering fluid under pressure into the tank so as to sweep any deposited matter into said first-mentioned pipe.

20. In an apparatus for the purification of sewage, the combination of a septic tank, means for excluding air and light, a non-disturbing inlet for said tank disposed below the normal water-level thereof and provided with a broadened mouth, a non-disturbing outlet for said tank disposed below the normal water-level thereof and provided with a broadened mouth, and a sewage-conduit connected with said inlet.

21. The process of liquefying the solid matter contained in sewage, which consists in secluding a pool of sewage having a non-disturbing inflow and outflow from light, air and agitation until a thick scum is formed on the surface thereof and a mass of micro-organisms has been developed of a character and quantity sufficient to liquefy the solid matter of the flowing sewage, the inflow serving to sustain the micro-organisms, and then subjecting said pool under the cover of said scum and under a non-disturbing inflow and outflow to the liquefying action of the so-cultivated micro-organisms until the solid matter contained in the flowing sewage is dissolved.

22. In an apparatus for the purification of sewage, the combination of a septic tank, means for excluding air and light, a non-disturbing inlet for said tank disposed below the normal water-level thereof, a non-disturbing outlet for said tank disposed below the normal water-level thereof, and a sewage-conduit connected with said inlet.

DONALD CAMERON.
FRED. J. COMMIN.
ARTHUR J. MARTIN.

Witnesses:
ALBERT ZELLEY,
ALEX. G. MATTHEWS.

DISCLAIMER.

634,423.—*Donald Cameron, Frederick J. Commin,* and *Arthur J. Martin,* Exeter, England. PROCESS OF AND APPARATUS FOR TREATING SEWAGE. Patent dated October 3, 1899. Disclaimer filed February 21, 1908, by assignee.

Enters its disclaimer—

"From claims 5, 6, 7, 8, 11, 12, 20 and 22, and each of them, of every combination excepting such as contains a tank which is shallow in comparison with its length and in which the septic scum and deposit exist whereby the anaerobic bacteria are presented to the flowing current of sewage."—[*Official Gazette, March 3, 1908.*]